United States Patent
Kitahara et al.

(10) Patent No.: US 6,790,319 B2
(45) Date of Patent: Sep. 14, 2004

(54) METHOD FOR RECOVERING TITANIUM COMPOUND, PROCESS FOR PREPARING TITANIUM HALIDE, AND PROCESS FOR PREPARING CATALYST FOR POLYMER PRODUCTION

(75) Inventors: Takumi Kitahara, Yamaguchi (JP); Tetsuya Nakano, Yamaguchi (JP)

(73) Assignee: Mitsui Chemicals, Inc., Tokyo (JP)

( * ) Notice: Subject to any disclaimer, the term of this patent is extended or adjusted under 35 U.S.C. 154(b) by 0 days.

(21) Appl. No.: 09/994,899

(22) Filed: Nov. 28, 2001

(65) Prior Publication Data

US 2002/0110514 A1 Aug. 15, 2002

(30) Foreign Application Priority Data

Dec. 1, 2000 (JP) ........................................ 2000-366664

(51) Int. Cl.$^7$ ........................... B01D 3/34; C01G 23/02; B01J 31/38
(52) U.S. Cl. ............................. 203/29; 203/38; 203/71; 203/67; 203/DIG. 25; 423/76; 423/4.92; 502/104; 502/107; 502/119
(58) Field of Search ............................. 203/29, 38, 71, 203/67, DIG. 25, 6; 423/76, 492; 502/104, 107, 119; 570/211

(56) References Cited

U.S. PATENT DOCUMENTS

| 2,754,256 A | * | 7/1956 | Stambaugh ................... 423/76 |
| 2,880,199 A | * | 3/1959 | Jezl ............................. 526/69 |
| 2,915,364 A | * | 12/1959 | Clabaugh et al. ............. 423/76 |
| 3,156,630 A | * | 11/1964 | Fahnoe et al. ................. 203/4 |
| 3,533,733 A | * | 10/1970 | Clark et al. ................... 423/77 |
| 4,472,521 A | * | 9/1984 | Band ........................... 502/104 |
| 4,497,905 A | | 2/1985 | Nozaki |
| 4,725,338 A | * | 2/1988 | Asanuma et al. ............. 203/38 |
| 4,914,069 A | | 4/1990 | Job et al. |
| 5,242,549 A | * | 9/1993 | Potter et al. .................. 203/6 |
| 5,371,157 A | * | 12/1994 | Job ........................... 526/124.9 |
| 6,124,507 A | * | 9/2000 | Wilson et al. ................ 568/648 |
| 6,358,372 B1 | * | 3/2002 | Zum Mallen ................. 203/6 |

FOREIGN PATENT DOCUMENTS

CN 1232043 A 10/1999

\* cited by examiner

Primary Examiner—Virginia Manoharan
(74) Attorney, Agent, or Firm—Burns, Doane, Swecker & Mathis, L.L.P.

(57) ABSTRACT

A method for recovering a titanium compound includes bringing a waste solution containing a titanium alkoxide into contact with a halogenating agent to convert at least a part of the titanium alkoxide to a titanium halide, and then distilling the solution containing the titanium halide to recover the titanium halide from the solution, or the method includes distilling a waste solution containing a titanium alkoxide and a titanium halide to recover at least a part of the titanium halide from the waste solution, bringing a residue in a distiller after the distillation into contact with a halogenating agent to convert at least a part of the titanium alkoxide to a titanium halide, and distilling the solution containing the titanium halide to recover the titanium halide from the solution. The method can recover an increased amount of a titanium compound from a waste solution containing a titanium alkoxide.

9 Claims, No Drawings

METHOD FOR RECOVERING TITANIUM COMPOUND, PROCESS FOR PREPARING TITANIUM HALIDE, AND PROCESS FOR PREPARING CATALYST FOR POLYMER PRODUCTION

FIELD OF THE INVENTION

The present invention relates to a method for recovering a titanium compound, a process for preparing a titanium halide, and a process for preparing a catalyst for polymer production. More particularly, the invention relates to a method for recovering a titanium compound from a waste solution containing a titanium alkoxide and the like, wherein the waste solution is generated in the process for preparing a catalyst for polymer production or a catalyst component for polymer production; a process for preparing a titanium halide from the waste solution; and a process for preparing a catalyst for polymer production from the titanium halide prepared by the process.

BACKGROUND OF THE INVENTION

As catalysts for use in the production of homopolymers of α-olefins and olefin polymers such as ethylene/α-olefin copolymers, those containing a titanium compound supported on an active magnesium halide are heretofore known. Such olefin polymerization catalysts are, for example, catalysts comprising a solid titanium catalyst component containing magnesium, titanium and a halogen as essential ingredients and an organometallic compound catalyst component. The solid titanium catalyst component containing magnesium, titanium and a halogen as essential ingredients is prepared by, for example, a process comprising contacting a liquid magnesium compound with a liquid titanium compound in the presence of an electron donor such as an alcohol to form a solid product and then further contacting the solid product with a liquid titanium compound to form a solid titanium catalyst component.

In the preparation of the solid titanium catalyst component, a waste solution containing an unsupported titanium compound and other titanium compounds newly produced by the reaction in the preparation process is generated after the recovery of the solid titanium catalyst component. In the conventional method, the waste solution is vacuum distilled to recover these titanium compounds. By this method, however, solid matters are precipitated in the distillation mother liquor or on the tray, so that discharge of the residue in distiller sometimes becomes difficult, or because of occurrence of differential pressure in the column, continuation of distillation sometimes becomes difficult. At present, therefore, distillation is terminated without sufficiently recovering the titanium compound, and the residue in distiller is discarded.

OBJECT OF THE INVENTION

The present invention has been made under such circumstances as described above, and it is an object of the invention to provide a method for recovering a titanium compound from a waste solution containing a titanium alkoxide and the like, wherein the waste solution is generated in the process for preparing a catalyst for polymer production or a catalyst component for polymer production, and to provide a process for preparing a titanium halide from the waste solution. It is another object of the invention to provide a process for preparing a catalyst for polymer production from the titanium halide obtained by the above process.

SUMMARY OF THE INVENTION

The method for recovering a titanium compound according to the invention comprises bringing a waste solution containing a titanium alkoxide into contact with a halogenating agent to convert the titanium alkoxide to a titanium halide and then distilling the solution containing the titanium halide to recover the titanium halide from the solution.

The method for recovering a titanium compound according to the invention may comprise distilling a waste solution containing a titanium alkoxide and a titanium halide to recover a part of the titanium halide from the waste solution, bringing a residue in distiller given after the distillation into contact with a halogenating agent to convert at least a part of the titanium alkoxide to a titanium halide and then distilling the solution containing the titanium halide to recover the titanium halide from the solution.

The process for preparing a titanium halide according to the invention comprises bringing a waste solution containing a titanium alkoxide into contact with a halogenating agent to convert the titanium alkoxide to a titanium halide.

The process for preparing a titanium halide according to the invention, in another embodiment, comprises distilling a waste solution containing a titanium alkoxide and a titanium halide to recover a part of the titanium halide from the waste solution and bringing a residue in distiller given after the distillation into contact with a halogenating agent to convert the titanium alkoxide to a titanium halide.

The waste solution is, for example, a solution formed when a catalyst for polymer production or a catalyst component for polymer production is prepared, such as a solution formed when an olefin polymerization solid titanium catalyst component containing titanium, magnesium and a halogen as essential ingredients is prepared by the contact of a magnesium compound, a titanium compound and an electron donor.

The process for preparing a catalyst for polymer production according to the invention comprises using the titanium halide obtained by the above process to prepare a catalyst for polymer production such as a catalyst for polyolefin production.

DETAILED DESCRIPTION OF THE INVENTION

The method for recovering a titanium compound, the process for preparing a titanium halide and the process for preparing a catalyst for polymer production according to the present invention are described in detail hereinafter.

In the method for recovering a titanium compound according to the invention, a titanium compound is recovered as a titanium halide from a waste solution containing a titanium alkoxide or a waste solution containing a titanium alkoxide and a titanium halide.

In the present invention, there is no specific limitation regarding the waste solution containing a titanium alkoxide, and not only a waste solution formed when a catalyst for polyolefin production or a catalyst component for polyolefin production is prepared but also waste solutions formed when catalysts for production of other polymers or catalyst components for production of other polymers are prepared and having a possibility of containing a titanium alkoxide are all employable as the waste solution containing a titanium alkoxide for use in the present invention.

In the present invention, there is no specific limitation regarding the waste solution containing a titanium alkoxide and a titanium halide, and not only a waste solution formed when a catalyst for polyolefin production or a catalyst component for polyolefin production is prepared but also waste solutions formed when catalysts for production of other polymers or catalyst components for production of other polymers are prepared and having a possibility of containing a titanium alkoxide and a titanium halide are all employable as the waste solution containing a titanium alkoxide and a titanium halide for use in the present invention.

Examples of the catalysts for polyolefin production include Ziegler-Natta catalysts, metallocene catalysts and post metallocene catalysts, and examples of the catalysts for production of other polymers include solid titanium catalysts for polyethylene terephthalate production.

Examples of the titanium alkoxides and the titanium halides contained in the waste solutions include those used in the preparation of catalysts (catalyst components), such as those used as starting materials and those produced by the reactions in the preparation process.

Next, a method for recovering a titanium compound from a waste solution containing a titanium alkoxide or a waste solution containing a titanium alkoxide and a titanium halide, each solution being formed when a solid titanium catalyst component for olefin polymerization is prepared, is described as an example.

The solid titanium catalyst component is prepared by contacting a magnesium compound, a titanium compound, and optionally, an electron donor and an organometallic compound, which are described below.

Titanium Compound

The titanium compound for use in the preparation of a solid titanium catalyst component is, for example, a tetravalent titanium compound represented by the following formula:

$$Ti(OR)_n X_{4-n}$$

wherein R is a hydrocarbon group, X is a halogen atom, and $0 \leq n \leq 4$.

Examples of such titanium compounds include titanium tetrahalide, alkoxytitanium trihalide, dialkoxytitanium dihalide, trialkoxytitanium monohalide and tetraalkoxytitanium.

Of these, preferable is a halogen-containing titanium compound, more preferable is titanium tetrahalide, and particularly preferable is titanium tetrachloride. These titanium compounds may be used singly or in combination of two or more kinds. Further, these titanium compounds may be diluted with hydrocarbon compounds or halogenated hydrocarbon compounds.

Magnesium Compound

The magnesium compound for use in the preparation of a solid titanium catalyst component is, for example, a magnesium compound having reducing ability or a magnesium compound having no reducing ability.

Examples of the organomagnesium compounds having reducing ability include a dialkylmagnesium compound, alkylmagnesium halide and alkylmagnesium alkoxide.

Examples of the magnesium compounds having no reducing ability include magnesium halide, alkoxymagnesium halide, aryloxymagnesium halide, alkoxymagnesium, aryloxymagnesium and magnesium hydride.

The magnesium compounds having no reducing ability may be magnesium compounds derived from magnesium compound having reducing ability. In order to derive the magnesium compounds having no reducing ability from the magnesium compounds having reducing ability, the magnesium compounds having reducing ability are brought into contact with polysiloxane compounds, halogen-containing silane compounds, halogen-containing aluminum compounds, esters or alcohols.

The magnesium compound for use in the preparation of a solid titanium catalyst component preferably takes a form of a halogen-containing magnesium compound in the finally obtained solid titanium catalyst component. In the use of a magnesium compound containing no halogen, therefore, it is preferable to contact the magnesium compound with a halogen-containing compound during the course of the preparation.

As the magnesium compound, preferable is a magnesium compound having no reducing ability, more preferable is a halogen-containing magnesium compound, and particularly preferable is magnesium chloride, alkoxymagnesium chloride or aryloxymagnesium chloride.

Electron Donor

In the preparation of a solid titanium catalyst component, it is preferable to use an electron donor. Examples of the electron donors include alcohols, phenols, ketones, aldehydes, carboxylic acids, acid halides, esters of organic acids or inorganic acids, ethers, acid amides, acid anhydrides, ammonia, amines, nitrites, isocyanate, nitrogen-containing cyclic compounds, oxygen-containing cyclic compounds and organosilicon compounds. Of these, preferably used are alcohols of 1 to 18 carbon atoms, such as methanol, ethanol, propanol, butanol, pentanol, hexanol, 2-ethylhexanol, octanol, dodecanol, octadecyl alcohol, oleyl alcohol, benzyl alcohol, phenylethyl alcohol, cumyl alcohol, isopropyl alcohol and isopropylbenzyl alcohol; and halogen-containing alcohols of 1 to 18 carbon atoms, such as trichloromethanol, trichloroethanol and trichlorohexanol.

These election donors may be used singly or in combination of two or more kinds.

Organoaluminum Compound

The organometallic compound which may be used in the preparation of a solid titanium catalyst component is, for example, an organoaluminum compound represented by the following formula:

$$R^a{}_n AlY_{3-n}$$

wherein $R^a$ is a hydrocarbon group of 1 to 12 carbon atoms; Y is $-OR^b$, $-OSiR^c{}_3$, $-OAlR^d{}_2$, $-NR^e{}_2$, $-SiR^f{}_3$ or $-N(R^g)AlR^h{}_2$ n is 1 to 2; $R^b$, $R^c$, $R^d$ and $R^h$ are each methyl, ethyl, isopropyl, isobutyl, cyclohexyl, phenyl or the like; $R^e$ is a hydrogen atom, methyl, ethyl, isopropyl, phenyl, trimethylsilyl or the like; and $R^f$ and $R^g$ are each methyl, ethyl or the like.

Process for Preparation of Solid Titanium Catalyst Component

The solid titanium catalyst component can be prepared by contacting the titanium compound, the magnesium compound, and optionally, the electron donor, and can be prepared by, for example, the following processes. In the following processes for preparing the solid titanium catalyst component, an electron donor is used, however, the electron donor is not necessarily used.

(1) A solution consisting of a magnesium compound, an electron donor and a hydrocarbon solvent is contacted with a titanium compound after or with precipitating a solid by the contact of the solution with an organometallic compound.

(2) A complex consisting of a magnesium compound and an electron donor is contacted with an organometallic compound and then contacted with a titanium compound.

(3) A contact product of an inorganic carrier with an organomagnesium compound is contacted with a titanium compound and preferably an electron donor. In this process, the contact product may be previously contacted with a halogen-containing compound and/or an organometallic compound.

(4) From a mixture of a solution containing a magnesium compound, an electron donor and optionally a hydrocarbon solvent, and an inorganic or organic carrier, a magnesium compound-supported inorganic or organic carrier is obtained, and then the carrier is contacted with a titanium compound.

(5) A solution containing a magnesium compound, a titanium compound, an electron donor and optionally a hydrocarbon solvent is contacted with an inorganic or organic carrier to obtain a solid titanium catalyst component on which magnesium and titanium are supported.

(6) A liquid organomagnesium compound is contacted with a halogen-containing titanium compound. In this process, an electron donor is used at least once.

(7) A liquid organomagnesium compound is contacted with a halogen-containing compound and then contacted with a titanium compound. In this process, an electron donor is used at least once.

(8) An alkoxy group-containing magnesium compound is contacted with a halogen-containing titanium compound. In this process, an electron donor is used at least once.

(9) A complex consisting of an alkoxy group-containing magnesium compound and an electron donor is contacted with a titanium compound.

(10) A complex consisting of an alkoxy group-containing magnesium compound and an electron donor is contacted with an organometallic compound and then contacted with a titanium compound.

(11) A magnesium compound, an electron donor and a titanium compound are contacted in an arbitrary order to perform reaction. In this reaction, each component may be pretreated with an electron donor and/or an organometallic compound, or a reaction assistant such as a halogen-containing silicon compound. In this process, it is preferable to use the electron donor at least once.

(12) A liquid magnesium compound having no reducing ability is reacted with a liquid titanium compound preferably in the presence of an electron donor to precipitate a solid magnesium-titanium complex.

(13) The reaction product obtained by the process (12) is further reacted with a titanium compound.

(14) The reaction product obtained by the process (11) or (12) is further reacted with an electron donor and a titanium compound.

(15) The compound obtained by any one of the processes (11) to (14) is treated with a halogen, a halogen compound or an aromatic hydrocarbon.

(16) A contact reaction product of a metallic oxide with organomagnesium and a halogen-containing compound is contacted with a titanium compound and preferably an electron donor.

(17) A magnesium compound, such as a magnesium salt of an organic acid, alkoxymagnesium or aryloxymagnesium, is reacted with a titanium compound and/or a halogen-containing hydrocarbon, and preferably an electron donor.

(18) A hydrocarbon solution containing at least a magnesium compound and alkoxytitanium is contacted with a titanium compound and/or an electron donor. In this process, a halogen-containing compound such as a halogen-containing silicon compound is preferably allowed to be present.

(19) A liquid magnesium compound having no reducing ability is reacted with an organometallic compound to precipitate a solid magnesium-metal (aluminum) complex and then reacted with an electron donor and a titanium compound.

Recovering Method

In the process for preparing the solid titanium catalyst component, a waste solution containing a titanium compound which was used as a starting material but not supported on the solid titanium catalyst component or a titanium compound produced by the reaction in the preparation process is formed.

Of various waste solutions, a waste solution containing at least a titanium alkoxide as a titanium compound is used in the method for recovering a titanium compound according to the invention.

Titanium Alkoxide

The titanium alkoxide is formed by, for example, contacting a titanium compound with an alcohol in the preparation of the solid titanium catalyst component.

The titanium alkoxide is represented by, for example, the following formula:

$Ti(OR)_m X_n$ wherein R is a hydrocarbon group, such as an aliphatic hydrocarbon group, an alicyclic hydrocarbon group or an aromatic hydrocarbon group, X is a halogen atom of fluorine, chlorine, bromine or iodine, m is an integer of 1 to 4, n is an integer of 0 to 3, and m+n=4.

In the present invention, the number of the alkoxy groups bonded to the titanium alkoxide is preferably one, and the hydrocarbon group to form alkoxide is preferably an aliphatic hydrocarbon group, from the viewpoint of ease of recovery of a titanium compound from the waste solution.

Examples of the aliphatic hydrocarbon groups include alkyl groups of 1 to 12 carbon atoms, such as methyl, ethyl, n-propyl, i-propyl, n-butyl, i-butyl, t-butyl, pentyl, heptyl, hexyl, octyl, 2-ethylhexyl, nonyl and decyl.

The residual group bonded to Ti is preferably Cl, and the number of the residual groups is preferably 3.

Preferred examples of the titanium alkoxides include $Ti(OEt)Cl_3$ and $Ti(O-2-ethylhexyl)Cl_3$.

Whether the titanium alkoxide is contained or not can be ascertained by, for example, hydrolyzing the object compound and checking whether an alcohol is contained in the product or not.

The waste solution, which is formed in the preparation of the solid titanium catalyst component and contains a titanium alkoxide, usually contains 30 to 99% by weight of a titanium compound containing a titanium alkoxide, and a hydrocarbon.

In the method for recovering a titanium compound according to the invention, first, the waste solution is brought into contact with a halogenating agent to convert at least a part of a titanium alkoxide contained in the waste solution to a titanium halide (e.g., $TiCl_4$, $TiBr_4$, $TiI_4$).

Halogenating Agent

The halogenating agent for use in the invention is not specifically restricted provided that it can halogenate the titanium alkoxide to form a titanium halide, and any of an inorganic halide, an organic halide and a halogen gas such as hydrogen chloride and chlorine gas is employable.

The inorganic halide is, for example, a metallic halide or a non-metallic halide, and the metallic halide is, for example, an acid halide or an alkyl halide.

(1) The metallic halide is, for example, a compound represented by the following formula (i):

$$MX_n \qquad (i)$$

wherein M is selected from Li, Be, Na, Mg, Al, K, Ca, Sc, V, Cr, Mn, Fe, Ni, Cu, Zn, Ga, Pd, Sn and the like, and is preferably selected from Na, Mg, Al, Mn, Fe, Cu, Zn and Sn;

X is a halogen of F, Cl, Br or I, and is preferably Cl; and n is a number satisfying a valence of M.

Examples of such metallic halides include $MgCl_2$, $AlCl_3$ and $FeCl_3$. Of these, $AlCl_3$ is preferable.

(2) The non-metallic halide is, for example, a compound represented by the following formula (ii):

$$A{=}BX_m \qquad (ii)$$

wherein A is an oxygen atom or a sulfur atom, B is a carbon atom, a sulfur atom or a phosphorus atom, X is a halogen, and m is a value obtained by subtracting 2 from the valence of B.

Examples of such non-metallic halides include $O{=}CCl_2$, $O{=}SCl_2$ and $O{=}PCl_3$.

Phosphorus pentachloride or phosphorus trichloride is also available as the non-metallic halide.

Of the non-metallic halides mentioned above, a compound represented by the formula $A{=}BX_m$ is preferable, and $O{=}SCl_2$ is particularly preferable.

(3) The acid halide is, for example, a compound represented by the following formula (iii):

$$R{-}(C{=}O)X \qquad (iii)$$

wherein R is a hydrocarbon group, and X is a halogen.

Examples of such acid halides include $PhCOCl$ and $CH_3COCl$.

(4) The halogenated hydrocarbon is, for example, a compound represented by the following formula (iv):

$$R_pCX_{4-p} \qquad (iv)$$

wherein R is a hydrocarbon group, particularly preferably an alkyl group; and p is an integer of 0 to 3.

Examples of such halogenated hydrocarbons include $(CH_3)_3CCl$, $CHCl_3$ and $CCl_4$. Particularly preferable is a compound of the above formula wherein R is a tertiary alkyl.

Of the halogenating agents mentioned above, an inorganic halide is preferable, and a metallic halide is particularly preferable.

Of the above compounds, a compound capable of halogenating a titanium alkoxide under the conditions of the contact of the waste solution with the compound (halogenating agent) is used in the present invention, and whether a compound is capable of halogenating the titanium alkoxide or not can be ascertained by practically contacting a waste solution containing alkoxytitanium with the object compound under the reaction conditions to confirm whether the titanium alkoxide is halogenated or not.

In case of, for example, an acid halide, an ester is formed by the contact of the acid halide with a titanium alkoxide, so that halogenation can be confirmed by formation of an ester. In case of a metallic halide, the reaction mixture given after completion of the reaction is distilled under the same conditions as those used for objective the titanium halide to see if a liquid is distilled from the mother liquor, whereby whether the titanium alkoxide is halogenated or not can be ascertained.

When the hydrocarbon group to constitute the alkoxy group of the titanium alkoxide is a hydrocarbon group of 4 or less carbon atoms, such as methyl, ethyl, n-propyl, i-propyl, n-butyl, i-butyl or t-butyl, it is preferable to use an inorganic halide as the halogenating agent.

When the hydrocarbon group to constitute the alkoxy group of the titanium alkoxide is a hydrocarbon group of 5 or more carbon atoms, such as pentyl, heptyl, hexyl, octyl, 2-ethylhexyl, nonyl or decyl, it is preferable to use an inorganic halide, particularly a metallic halide, as the halogenating agent.

Also preferable is a halogenating agent which forms, when reacted with the titanium alkoxide, a by-product that is a gas under the reaction conditions. For example, if $SOCl_2$ is used as the halogenating agent, $SO_2$ is formed as a by-product, and if $COCl_2$ is used as the halogenating agent, $CO_2$ is formed as a by-product. If the by-product is a gas under the reaction conditions like this, the reaction can be carried out with removing the by-product. As a result, the amount of the waste is decreased, and for example, when the waste is disposed of by reclamation, the amount of the waste to dispose of by reclamation is decreased.

When $SOCl_2$ is used, titanium halide is recovered by, for example, the following reaction.

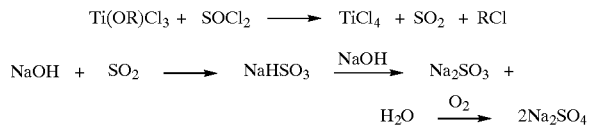

In the contact of the waste solution with the halogenating agent, the halogenating agent is used in an amount of usually 0.1 to 10 mol, preferably 0.5 to 3 mol, more preferably 1 to 1.2 mol, based on 1 mol of the alkoxy group of the titanium alkoxide contained in the waste solution. When the halogenating agent is a non-metallic halide, the non-metallic halide is used in an amount of usually 0.1 to 10 mol, preferably 0.5 to 3 mol, more preferably 1 to 3 mol, based on 1 mol of the alkoxy group of the titanium alkoxide.

The temperature in the contact of the waste solution with the halogenating agent is in the range of usually 20 to 100° C., preferably 60 to 90° C., and the contact time is in the range of usually 1 to 10 hours, preferably 2 to 4 hours.

When the titanium alkoxide contained in the waste solution is a lower alkoxide, the component formed as a by-product by the reaction thereof with the halogenating agent is a gas under the usual reaction conditions, so that the reaction can be carried out with removing the by-product.

Then, the contact product of the waste solution with the halogenating agent obtained as above is distilled by a distiller to recover the titanium halide contained in the contact product. The distillation is carried out under the conditions of a bottom temperature of 70 to 150° C., a top temperature of 60 to 140° C., a top pressure of atmospheric pressure to 5.3 kPa, and a reflux rate of 300 to 900 kg/hr. Although the amount of the titanium halide recovered from the contact product by the distillation is not specifically restricted, the amount is usually in the range of about 40 to 99% by weight in terms of a titanium atom, based on the amount of the titanium compound in the contact product. The titanium halide is recovered together with the low-boiling component contained in the contact product.

In another embodiment of the method for recovering a titanium compound according to the invention, of all the waste solutions formed in the preparation of the solid titanium catalyst component, a waste solution containing at least a titanium alkoxide and a titanium halide as titanium compounds is used.

The waste solution, which is formed in the preparation of the solid titanium catalyst component and contains a titanium alkoxide and a titanium halide, usually contains 30 to 99% by weight of a titanium compound containing a titanium alkoxide and a titanium halide, and a hydrocarbon.

In the method for recovering a titanium compound according to the invention, first, the waste solution is distilled by a distiller to recover a part of the titanium halide contained in the waste solution.

The distillation of the waste solution by a distiller to recover a part of the titanium halide contained in the waste solution is carried out under the conditions of a bottom temperature of 70 to 150° C., a top temperature of 60 to 140° C., a top pressure of atmospheric pressure to 5.3 kPa, and a reflux rate of 300 to 900 kg/hr. Although the amount of the titanium halide recovered from the waste solution by the distillation is not specifically restricted, the amount is usually in the range of about 40 to 99% by weight in terms of a titanium atom, based on the amount of the titanium compound in the waste solution. The titanium halide is recovered together with the low-boiling component contained in the waste solution.

Then, the residue in distiller given after the distillation is brought into contact with the halogenating to agent to convert at least a part of the titanium alkoxide contained in the residue to a titanium halide.

In the contact of the residue in distiller with the halogenating agent, the halogenating agent is used in an amount of usually 0.1 to 10 mol, preferably 0.5 to 3 mol, more preferably 1 to 1.2 mol, based on 1 mol of the alkoxy group of the titanium alkoxide contained in the residue. When the halogenating agent is a non-metallic halide, the non-metallic halide is used in an amount of usually 0.1 to 10 mol, preferably 0.5 to 3 mol, more preferably 1 to 3 mol, based on 1 mol of the alkoxy group of the titanium alkoxide.

The temperature in the contact of the residue in distiller with the halogenating agent is in the range of usually 20 to 100° C., preferably 60 to 90° C., and the contact time is in the range of usually 1 to 10 hours, preferably 2 to 4 hours.

Then, the contact product of the residue with the halogenating agent obtained as above is distilled by a distiller to recover a titanium halide contained in the contact product.

When the titanium compound is recovered from the waste solution as described above, not less than 90% by weight of the titanium compound contained in the waste solution, preferably the titanium compound used in the preparation of a catalyst (component), can be recovered.

The low-boiling component separated and recovered from the waste solution and the residue in distiller and containing a titanium halide is purified in a conventional way to recover the titanium halide. The titanium halide thus recovered can be used as, for example, a starting material of a catalyst (component) for polymer production.

The catalyst for polymer production such as a catalyst for polyolefin production can be prepared by the aforesaid process using the recovered titanium halide.

The by-product formed in the reaction of the halogenating agent with the titanium alkoxide can be treated as follows. If the by-product is a gas, it may be discharged outside the system of the process. If the by-product is a solid, it may be discarded though it is not limited thereto.

From the waste solution containing a titanium alkoxide or the waste solution containing a titanium alkoxide and a titanium halide, a titanium compound can be prepared by the above-described process.

EFFECT OF THE INVENTION

According to the present invention, a titanium compound can be efficiently recovered from a waste solution containing a titanium alkoxide or a waste solution containing a titanium alkoxide and a titanium halide, and can be recycled. Hence, the amount of the waste can be decreased. In particular, a titanium compound, which has been conventionally disposed of by reclamation as a waste, can be recycled, whereby effective utilization of the titanium component can be achieved, and the amount of the waste to dispose of by reclamation can be decreased.

EXAMPLE

The present invention is further described with reference to the following examples, but it should be construed that the invention is in no way limited to those examples.

The distiller residue A and the waste solution B used in the examples were obtained in the following manner.

Distiller Residue A

To a 200 ml glass autoclave, 250 ml of hexane was introduced, and 9.5 g of an hydrous magnesium chloride was added with stirring. Then, to the autoclave were dropwise added 35.5 ml of ethanol (dropwise addition: 30 min+post reaction: 30 min), 33.4 ml of diethylaluminum chloride (dropwise addition: 2 hr) and 86.4 ml of titanium tetrachloride (dropwise addition: 30 min) successively at a temperature of 30° C. Thereafter, the temperature was raised to 80° C., and maturing reaction was carried out for 3 hours.

The reaction solution was cooled to 30° C., and the supernatant liquid was removed. Then, washing with hexane was carried out several times, and the solid was collected by filtration.

On the other hand, the supernatant liquid and the filtrate were together distilled to recover hexane and titanium tetrachloride (final bottom temperature: 90° C., pressure: 6 kPa). The distiller residue after the distillation was taken as a distiller residue A.

Waste Solution B

19 Grams of anhydrous magnesium chloride, 88.4 ml of decane and 78.1 g of 2-ethylhexanol were heated at 140° C. for 3 hours to give a homogeneous solution. To the solution, 4.4 g of phthalic anhydride was added, and they were stirred and mixed at 130° C. for 1 hour to give a solution.

The homogeneous solution thus obtained was cooled to room temperature. Then, to 200 ml of titanium tetrachloride maintained at −20° C., 75 ml of the homogeneous solution was dropwise added over a period of 45 minutes, and the solution was maintained at the same temperature for 1 hour.

Subsequently, the temperature of the solution was raised to 110° C. over a period of 2 hours and 45 minutes. When the temperature became 110° C., 5.03 ml of diisobutyl phthalate was added, and they were heated at 110° C. for 2 hours.

After the reaction was completed, the solid was collected by hot filtration and resuspended in 275 ml of titanium tetrachloride. Then, the suspension was heated to 110° C. again, followed by heating at the same temperature for 2 hours.

After the reaction was completed, the solid was again collected by hot filtration and sufficiently washed with decane at 110° C. and hexane at room temperature until no liberated titanium compound was detected in the washing liquid.

On the other hand, the filtrate and the washing liquid were put together, and the resulting solution was taken as a waste solution B.

Example 1

To a 200 ml three-necked flask equipped with a condenser and a dropping funnel, 67 g of the distiller residue A (containing 13.7 g of titanium tetrachloride, 31.5 g of Ti(OEt)Cl$_3$, etc.) and 50 ml of decane were introduced. Thereafter, to the flask was dropwise added 39.1 g of thionyl chloride at room temperature through the dropping funnel, followed by stirring for 1 hour. Then, the reaction was conducted at 80° C. for 8 hours. After the reaction was completed, vacuum distillation was performed to obtain 38.2 g of titanium tetrachloride.

Example 2

To a 200 ml three-necked flask equipped with a condenser, 67 g of the distiller residue A and 50 ml of decane were introduced. Thereafter, 22 g of anhydrous aluminum chloride was added at room temperature, followed by stirring at room temperature for 1 hour. Then, the reaction was conducted at 80° C. for 2 hours. After the reaction was completed, vacuum distillation was performed to obtain 38.4 g of titanium tetrachloride.

The above procedure includes the following reaction.

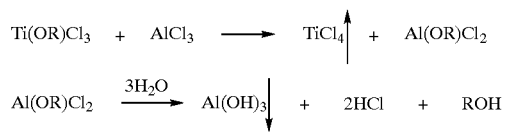

Example 3

To a 200 ml three-necked flask equipped with a condenser, 188.3 g of the waste solution B (containing 139 g of titanium tetrachloride, 25.6 g of Ti(O-2-ethylhexyl)Cl$_3$, etc.) was introduced, and 13.3 g of anhydrous aluminum chloride was added, followed by stirring at room temperature for 1 hour. Then, the reaction was conducted at 80° C. for 2 hours. After the reaction was completed, vacuum distillation was performed to obtain 144.7 g of titanium tetrachloride.

Example 4

19 Grams of anhydrous magnesium chloride, 88.4 ml of decane and 78.1 g of 2-ethylhexanol were heated at 140° C. for 3 hours to give a homogeneous solution. To the solution, 4.4 g of phthalic anhydride was added, and they were stirred and mixed at 130° C. for 1 hour to give a solution.

The homogeneous solution thus obtained was cooled to room temperature. Then, to 200 ml of the recovered titanium tetrachloride obtained in Example 3 maintained at −20° C., 75 ml of the homogeneous solution was dropwise added over a period of 45 minutes, and the solution was maintained at the same temperature for 1 hour.

Subsequently, the temperature of the solution was raised to 110° C. over a period of 2 hours and 45 minutes. When the temperature became 110° C., 5.03 ml of diisobutyl phthalate was added, and they were heated at 110° C. for 2 hours.

After the reaction was completed, the solid was collected by hot filtration and resuspended in 275 ml of the recovered titanium tetrachloride. Then, the suspension was heated to 110° C. again, followed by heating at the same temperature for 2 hours.

After the reaction was completed, the solid was again collected by hot filtration and sufficiently washed with decane at 110° C. and hexane at room temperature until no liberated titanium compound was detected in the washing liquid.

Thus obtained solid titanium component was stored as hexane slurry. A part of the hexane slurry of the solid titanium component was collected and dried to measure the composition of the solid titanium component.

The results are shown in Table 1.

Polymerization

To 2 liter autoclave, were introduced 750 ml of purified hexane, and further, at 70° C., under propylene atmosphere, 0.75 mmol of triethylaluminum, 0.075 mmol of cyclohexylmethyl dimethoxy silane, and 0.015 mmol, in terms of titanium atom, of the solid titanium catalyst component obtained above.

Then, 200 ml of hydrogen was introduced, thereafter temperature of the autoclave was raised to 70° C., and the temperature was maintained at 70° C. to perform propylene polymerization for 2 hours. When the polymerization was completed, the slurry containing the resulting polymer (solid) was filtrated to separate white powder and liquid phase. Properties of the resulting polymer are shown in Table 1.

TABLE 1

| Composition of the catalyst | |
| --- | --- |
| Ti (mg/g-cat.) | 24 |
| Mg (mg/g-cat.) | 190 |
| DIBP (mg/g-cat.) | 127 |
| Polymerization activity | |
| g-pp/mmol-Ti | 30200 |
| g-pp/g-cat. | 10500 |
| Properties of polymer | |
| Bulk density (kg/m$^3$) | 460 |
| MER (g/10 min.) | 3.1 |
| P-II (%) | 98.9 |
| T-II (%) | 98.6 |

What is claimed is:

1. A method for recovering a titanium compound, comprising bringing a waste solution containing a titanium alkoxide into contact with a halogenating agent to convert the titanium alkoxide to a titanium halide and then distilling the solution containing the titanium halide to recover the titanium halide from the solution.

2. The method for recovering a titanium compound as claimed in claim 1, wherein the waste solution is a solution formed when a catalyst for polymer production or a catalyst component for polymer production is prepared.

3. A process for preparing a catalyst for polymer production, comprising:

recovering titanium halide according to the method of claim 1; and preparing a catalyst for polymer production with the titanium halide.

4. A method for recovering a titanium compound, comprising distilling a waste solution containing a titanium alkoxide and a titanium halide to recover a part of the titanium halide from the waste solution, bringing a residue in a distiller after the distilling into contact with a halogenating agent to convert the titanium alkoxide to a titanium halide, and then distilling the solution containing the titanium halide to recover the titanium halide from the solution.

5. The method for recovering a titanium compound as claimed in claim 4, wherein the waste solution is a solution formed when catalyst for polymer production or a catalyst component for polymer production is prepared.

6. A process for preparing a catalyst for polymer production, comprising:

recovering titanium halide according to the method of claim 2; and preparing a catalyst for polymer production with the titanium halide.

7. A process for preparing a titanium halide, comprising distilling a waste solution containing a titanium alkoxide and a titanium halide to recover a part of the titanium halide from the waste solution, and bringing a residue in a distiller after the distilling into contact with a halogenating agent to convert the titanium alkoxide to a titanium halide.

8. The process for preparing a titanium halide as claimed in claim 7, wherein the waste solution is a solution formed when a catalyst for polymer production or a catalyst component for polymer production is prepared.

9. A process for preparing a titanium halide, comprising bringing a waste solution containing a titanium alkoxide into contact with a halogenating agent to convert the titanium alkoxide to a titanium halide, wherein the halogenating agent is selected from the group consisting of:

(a) a metallic halide represented by the following formula (i):

$$MX_n \qquad (i)$$

wherein M is selected from the group consisting of Li, Be, Na, Mg, Al, K, Ca, Sc, V, Cr, Mn, Fe, Ni, Cu, Zn, Ga, Pd and Sn, X is F, Cl, Br or I, and n is a number satisfying a valence of M;

(b) a non-metallic halide represented by the following formula (ii):

$$A=BX_m \qquad (ii)$$

wherein A is an oxygen atom or a sulfur atom,

B is a carbon atom, a sulfur atom or a phosphorus atom,

X is a halogen, and m is a value obtained by subtracting 2 from the valence of B;

(c) an acid halide represented by the following formula (iii):

$$R-(C=O)X \qquad (iii)$$

wherein R is a hydrocarbon group, and

X is a halogen; and (d) a halogenated hydrocarbon represented by the following formula (iv):

$$R_pCX_{4-p} \qquad (iv)$$

wherein R is a hydrocarbon group,

X is a halogen, and p is an integer from 0 to 3.

* * * * *

UNITED STATES PATENT AND TRADEMARK OFFICE
CERTIFICATE OF CORRECTION

PATENT NO. : 6,790,319 B2
APPLICATION NO. : 09/994899
DATED : September 14, 2004
INVENTOR(S) : Takumi Kitahara et al.

It is certified that error appears in the above-identified patent and that said Letters Patent is hereby corrected as shown below:

Title Page, Item (56) References Cited, please insert:

5,866,750 A  2/1999  Tomaskovic et al.

5,948,212 A  9/1999  Kilty et al.

Signed and Sealed this

Second Day of January, 2007

JON W. DUDAS
*Director of the United States Patent and Trademark Office*